United States Patent
Schwarz

(10) Patent No.: US 10,798,447 B2
(45) Date of Patent: Oct. 6, 2020

(54) USAGE RULES ENFORCEMENT

(71) Applicant: NAGRAVISION S.A., Cheseaux-sur-Lausanne (CH)

(72) Inventor: Christian Schwarz, Cheseaux-sur-Lausanne (CH)

(73) Assignee: NAGRAVISION S.A., Cheseaux-sur-Lausanne (CH)

(*) Notice: Subject to any disclaimer, the term of this patent is extended or adjusted under 35 U.S.C. 154(b) by 16 days.

(21) Appl. No.: 16/302,501

(22) PCT Filed: May 19, 2017

(86) PCT No.: PCT/EP2017/062160
§ 371 (c)(1),
(2) Date: Nov. 16, 2018

(87) PCT Pub. No.: WO2017/198845
PCT Pub. Date: Nov. 23, 2017

(65) Prior Publication Data
US 2019/0174180 A1   Jun. 6, 2019

(30) Foreign Application Priority Data

May 20, 2016 (GB) .................... 1608946.8

(51) Int. Cl.
*H04N 21/4402* (2011.01)
*H04N 21/41* (2011.01)
(Continued)

(52) U.S. Cl.
CPC ..... *H04N 21/4402* (2013.01); *H04N 21/4126* (2013.01); *H04N 21/4405* (2013.01);
(Continued)

(58) Field of Classification Search
CPC ........... H04N 21/4402; H04N 21/8355; H04N 21/4627; H04N 21/4623; H04N 21/4405; H04N 21/4126

See application file for complete search history.

(56) References Cited

U.S. PATENT DOCUMENTS

2003/0086695 A1   5/2003   Okamoto et al.
2007/0258587 A1  11/2007   Harada et al.
(Continued)

FOREIGN PATENT DOCUMENTS

EP     1 764 696 A1      3/2007
WO   WO 03/088664 A1   10/2003

OTHER PUBLICATIONS

International Search Report and Written Opinion dated Jul. 20, 2017 in corresponding PCT/EP2017/062160.
(Continued)

*Primary Examiner* — Nam D Pham
(74) *Attorney, Agent, or Firm* — Oblon, McClelland, Maier & Neustadt, L.L.P.

(57) ABSTRACT

A content handling device comprises a plurality of content transformation modules that can define one or more paths from a content source module to a content sink module. The content is associated with one or more usage rules requiring one or more transformations to be applied to the content. To enforce usage rules, each content transformation module is configured to receive the content, apply a transformation to the content in accordance with the usage rules and apply a tagging operation corresponding to the transformation to the content. In some embodiments output of the content by the content sink module is prevented if all tagging operations corresponding to the usage rules have not been applied. While in some embodiments usage rule tags corresponding to the usage rules are embedded locally at the content handling device, the disclosure also extends to a content distribution system with a usage rule tag embedding functionality.

14 Claims, 15 Drawing Sheets

(51) Int. Cl.
*H04N 21/4405* (2011.01)
*H04N 21/4623* (2011.01)
*H04N 21/4627* (2011.01)
*H04N 21/8355* (2011.01)

(52) U.S. Cl.
CPC ..... *H04N 21/4623* (2013.01); *H04N 21/4627* (2013.01); *H04N 21/8355* (2013.01)

(56) References Cited

U.S. PATENT DOCUMENTS

| | | |
|---|---|---|
| 2007/0294173 A1 | 12/2007 | Levy et al. |
| 2009/0290851 A1 | 11/2009 | Okamoto et al. |
| 2009/0317057 A1* | 12/2009 | Wu .................. G11B 20/00086 386/252 |
| 2011/0258289 A1 | 10/2011 | Munetsugu et al. |

OTHER PUBLICATIONS

Search Report issued in United Kingdom Patent Application No. GB1608946.8.
International Search Report dated Jul. 20, 2017 in PCT/EP2017/062160 filed May 19, 2017.

* cited by examiner

| Embedded / received usage rule tag | Location (MPEG stream) | Usage rule tag operation | Usage rule tag check |
|---|---|---|---|
| String | PES header / Non-video-coding NAL unit | Remove Tag | All tags removed? |
| Watermark | Video-coding NAL unit | Remove Tag | All tags removed? |
| Function applied to content | Applied to all or part of content | Apply inverse function | Original content recovered? |
| Usage Rule | PES header / Non-video-coding NAL unit | Add tag | Consistency between usage rules and tags |

Fig. 16

_(12)_ United States Patent
USAGE RULES ENFORCEMENT

FIELD

The present disclosure relates to a content handling device, system and method for enforcing usage rules associated with media content, for example audio video content

BACKGROUND

Some digital rights management DRM and conditional access CA systems associate usage rules with media content. Usage rules specify what actions are allowed or forbidden in respect of the content and/or require certain actions to be taken. For example, a usage rule associated with a media content item may specify that the item may only be exported from a device in a certain video format, at a certain resolution and/or only in High-bandwidth Digital Content Protection HDCP encrypted form. Usage rules can be embedded in the content, for example in content headers. Taking the example of a Moving Picture Experts Group MPEG video stream with embedded usage rules, the usage rules may be embedded in the Entitlement Control Message ECM data. More generally, usage rules are provided in a way so that they are associated with the corresponding content and enforced along with the overall content management in the device.

Typically, transformations in accordance with usage rules are implemented by the middleware software stack of the device setting up a content pipeline and can be validated by software hosted in a trusted execution environment TEE for increased security. A TEE is an isolated environment executing in parallel to the host software, i.e. the middleware, and is protected through processor, memory and I/O isolation. Software in the TEE may be subject to a security lifecycle, including secure boot, update etc. Generally, the smaller the footprint of TEE software, the more trustworthy it is. Thus enforcing content usage rules with software running in a TEE still represents a vulnerability due to the associated increase in complexity of software running in the TEE and the general vulnerability of software, implementations to attack as compared to hardware implementations. While implementation of the enforcement of usage rules in software, whether in a TEE or not, allows for flexibility to use the hardware in the device in various ways that are consistent with the usage rules, it can be seen that this approach suffers from several drawbacks.

BRIEF DESCRIPTION OF THE DRAWINGS

FIG. 16 illustrates various types of usage rule tags and corresponding tagging operations and usage rule tag checks.

DETAILED DESCRIPTION OF THE DRAWINGS

Figure 1:
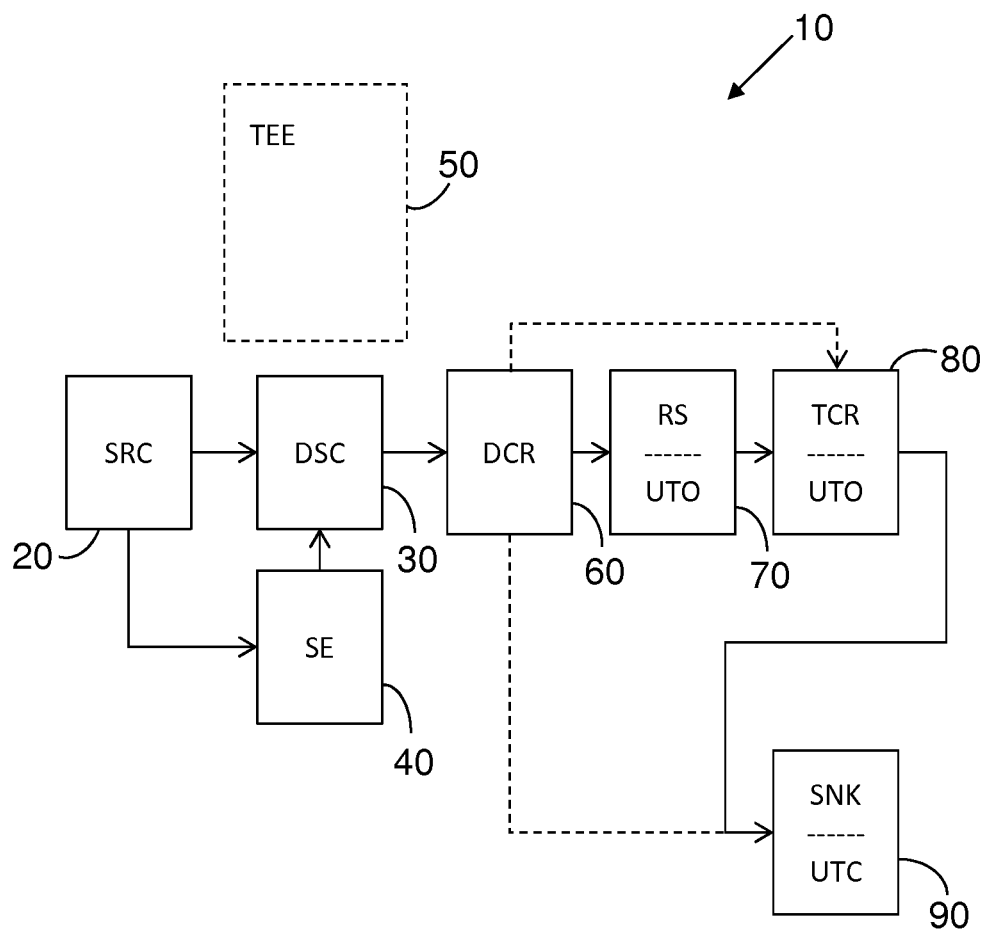
FIG. 1 illustrates a content handling device implementing various modules.

In overview, a content handling device in accordance with the disclosure comprises a plurality of content transformation modules that can define one or more paths from a content source module to a content sink module. The content is associated with one or more usage rules requiring one or more transformations to be applied to the content or one or more transformations to be excluded. To enforce usage rules, each content transformation module is configured to receive the content, apply a transformation to the content in accordance with the usage rules and apply a tagging operation corresponding to the transformation to the content. In some embodiments output of the content by the content sink module is prevented if all tagging operations corresponding to the usage rules have not been applied, or, in some embodiments, if any additional ones were added. While in some embodiments usage rule tags corresponding to the usage rules are embedded locally at the content handling device, the disclosure also extends to a content distribution system with a usage rule tag embedding functionality.

In some aspects of the disclosure a content handling device, for example a set top box, smart TV, personal computer, server, mobile device, phone or tablet, comprises a content source module for receiving content, a content sink module, for example a High-bandwidth Digital Content Protection/High-Definition Multimedia Interface HDCP/HDMI transmitter, for outputting content and a plurality of content transformation modules, for example transcoding and resizing modules. The modules define one or more paths from the content source module to the content sink module, for example in accordance with content usage rules. The content is associated with one or more usage rules requiring one or more transformations to be applied to the content, for example specifying that the content has to be transcoded and/or resized in a certain fashion before being allowed to be output. Each content transformation module is configured to receive the content, apply a transformation to the content in accordance with the one or more usage rules and apply a tagging operation, corresponding to the transformation. By arranging the content transformation modules, such that a tagging operation, corresponding to the respective transformation applied by the content transformation module is applied to the content when the transformation has been, is or will be applied to the content, each content transformation module contributes to the enforcement of the usage rules. In this way, the processing load of usage rule enforcement may be distributed. Further, by distributing usage rules enforcement to the point where the corresponding transformations are applied, a tampering attack on any single point in the device is less likely to succeed. Content extracted from the device by an attacker between the source and the sink may be degraded when visible usage rule tags have not been removed. It can be seen that the software components involved in validating usage rules is reduced, which may in itself improve security, such that an attacker is less likely to successfully extract content from the content pipeline.

In some embodiments, the device comprises a usage rule tag checking module. The usage rule tag checking module is configured to receive the content, determine whether all tagging operations corresponding to transformations required by the one or more usage rules have been applied to the content and, responsive to determination being positive, enabling the content to be output by the content sink module. In some embodiments, the determination may also comprise determining whether any additional tagging operations have been applied, other than those specified by the usage rules. The usage rule tag checking module is configured to degrade or block output of the content in the event that the determination is negative. In this way, the usage rule tag checking module ensures that the device only outputs content in accordance with the usage rules or that content is output in a degraded form if the usage rules have not been complied with. The usage rule tag checking module may be integrated with the content sink module or may be a separate module. In other embodiments, the device does not have a usage rule tag checking module. For example, each of the tagging operations is configured to remove a respective tag, for example a degradation or forensic mark, from the content, so that the content is output in tagged form, for example degraded or with one or more forensic marks, unless all the required transformations and corresponding tagging operations have been applied. In some embodiments, such tagging operations are combined with a usage rule tag checking module for enhanced security and the usage rule tag checking module may be configured to determine whether all required tagging operations have been applied by checking that all tags have been removed, i.e. none are remaining. In some embodiments, this check will also detect if additional transformations have been applied—in some of these embodiments the tagging operation comprises applying a tag that cancels out a corresponding usage rule tag but remains detectable, for example in the form of a visual or non-visual alteration of the content, if there is no usage rule tag to cancel.

In some embodiments, one or more usage rule tags, corresponding to one or more usage rules are embedded in the content. Each tag may correspond to a respective usage rule or a single tag may correspond to a number of usage rules, for example a sequence of usage rules. Depending on the embodiment, the tagging operation may comprise removing a usage rule tag corresponding to a respective usage rule from the content or the combined effect of operating on the one or more usage rule tags may be to remove the one or more usage tags. In some embodiments, a usage rule sequence tag corresponding to a sequence of usage rules is embedded in the content and a combined effect of operating on the usage rule sequence tag with a corresponding sequence of tagging operations is to remove the usage rule sequence tag. Each usage rule tag may comprise a watermark or the usage rule tags may collectively form a watermark. The watermark may be visible when playing back the content and may be arranged to degrade the content, preferably to a significant extent. Irrespective of whether the watermark is visible when playing back the content, the watermark may be a forensic watermark from which the content handling device can be identified.

In some embodiments, the content handling device comprises a usage rule tag embedding module. The usage rule tag embedding module is configured to receive the one or more usage rules, together with the content, read the usage rules, and embed one or more usage rule tags, corresponding to the one or more usage rules in the content. In other embodiments, the content handling device does not have a usage rule tag embedding module and the content is received with one or more usage rule tags already embedded. In some embodiments, the content is received in scrambled form, with or without usage rule tags embedded. In such embodiments, the device comprises a descrambling module coupled to the content source module to descramble received content together with one or more usage rules and/or usage rule tags.

The various modules may be implemented in software, dedicated hardware or a combination thereof. For example, one or more of the modules may be implemented in dedicated hardware components, with the remainder implemented in software. In some embodiments, each of one, some or all of the modules are implemented by a respective dedicated hardware module. One or more of the modules, for example the usage rule embedding or checking modules may be implemented in a TEE.

In some aspects of the disclosure, a content distribution system comprises storage for storing content to be distributed and one or more associated usage rules. The system further comprises a processor configured to process the content to be distributed to embed one or more usage rule tags, corresponding to respective one or more of the associated usage rules, in the content to be distributed. In particular, in some embodiments, the processor is configured to embed a usage rule tag corresponding to a usage rule, a usage rule tag corresponding to a sequence of usage rules and/or a usage rule tag corresponding to an unordered set of usage rules.

Further aspects of the disclosure relate to methods for handling content in accordance with usage rules and embedding usage rule tags in content to be distributed, for example using devices and systems as described above.

Some specific embodiments are now described by way of illustration with reference to the accompanying drawings in which like reference numerals refer to like features.

With reference to FIG. 1, embodiments of a content handling device 10, for example a set top box, smart TV, mobile device, or other video processing device, comprise a source module SRC 20, for example a receiver, such as a terrestrial, cable or satellite, analogue or digital receiver, a network interface for receiving over the top content, for example from the Internet, etc. The source module SRC 20 is configured to receive content together with usage rule tags embedded in the content. Usage rules corresponding to the usage rule tags may also be embedded in the content or may be received separately. Since the usage rule tags correspond to the usage rules, the content may be received without the usage rules themselves, in some embodiments.

The source module SRC 20 is further configured to provide the received content to a descrambler DSC 30 and a content key to enable the content to be descrambled, together with any access conditions, to a secure element SE 40, for example, a smart card or other dedicated secure hardware component. The secure element SE 40 is configured to decrypt the content key, subject to any access conditions, and to provide it to the descrambling module DSC 30 to enable the descrambling of the content, as is well known in the field of conditional access systems. Embodiments of the content handling device 10 that do not have conditional access functionality and in which content is received in clear form may omit the descrambler module DSC 30 and the secure element SE 40. In some embodiments, a digital rights management module may be provided instead. In some embodiments, the source module SRC 20 may be configured to carry out any pre-processing required.

The output of the descrambling module DSC 30 or the source module SRC 20, as applicable, comprising the descrambled content and embedded usage rules, is provided to a video decoding module DCR 60, for example an MPEG decoder, to decode the received content while maintaining the usage rules and/or usage rule tags embedded in the content. The content handling device 10 further comprises a resizing module RS 70, a transcoding module TCR 80 and a sink module SNK 90. The sink module SNK 90, in accordance with various embodiments, may comprise an output module, such as an HDCP or HDMI transmitter, or any other suitable output module. The resizing module RS 70 and the transcoding module TCR 80 are examples of content transformation modules, and it will be understood that the content handling device 10 may have any number of such modules in addition to or instead of the resizing modules RS 70 and the transcoding module TCR 80 and that these modules may include one, both or none of the resizing module RS 70 and the transcoding module TCR 80.

The content transformation modules define one or more possible content paths in accordance with the usage rules from the decoding module DCR 60 to the sink module SNK 90, for example, as illustrated in FIG. 1, a content path from the decoding module DCR 60 to the resizing modules RS 70 to the transcoding module TCR 80 to the sink module SNK 90. The content transformation modules, specifically the resizing module RS 70 and the transcoding module TCR 80, are configured to each process the content in accordance with the usage rules, for example each module processes content in accordance with a respective usage rule. Processing of the content between the modules and hence the content path, may be coordinated centrally, for example by a process running in the middleware, e.g. in a Rich Execution Environment rather than a TEE, or the modules may coordinate the processing of the content between themselves by passing the content from one module to the next, each previous module triggering processing by the next module.

In these specific embodiments, the content transformation modules, i.e. the resizing module RS 70 and the transcoding module 80 implement a respective tagging operation that operates on a usage rule tag embedded in the content, and the sink module SNK 90 implements a usage rule tag check that checks that all tagging operations corresponding to transformations required by the usage rules have been applied, as described in detail below. In some embodiments, such as the ones described above, the content is received with usage rule tags embedded. The usage rule tags may have been for example embedded at a distribution system such as a head end distributing the content. In other embodiments, as described below, the usage rule tags are embedded in the content based on received usage rules at the content handling device 10.

It will be understood that while the content handling device 10 is illustrated in the accompanying drawings with a particular content pipeline from the decoding module DCR 60 to the resizing module RS 70 to the transcoding module TCR 80 and finally to the sink module SNK 90, the content handling device 10 can also implement other content pipelines in accordance with the usage rule or rules associated with the received content, for example outputting content from the video decoding module DCR 60 directly to the sink module SNK 90 or via only one of the content transformation components 70, 80, as illustrated by the dashed lines in FIG. 1.

Figure 2:
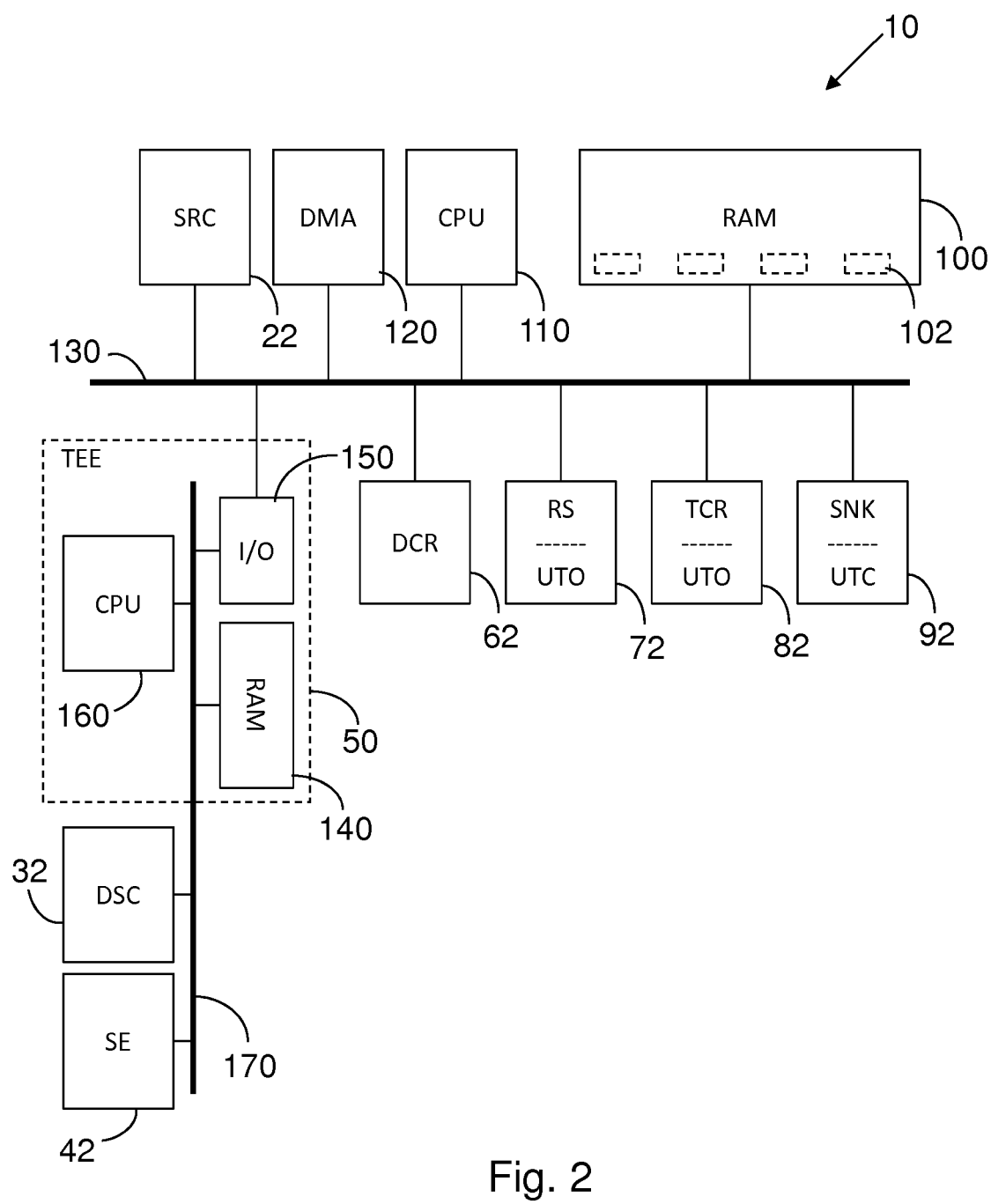
FIG. 2 illustrates a hardware implementation of the content handling device of FIG. 1.

With reference to FIG. 2, in a specific implementation, the content handling device 10 has a memory 100, which may comprise persistent or volatile random access memory and may include solid-state, optical magnetic storage. The device may further have read only memory or programmable read only memory, for example, for storing firmware. The content handling device 10 further has a central processing unit CPU 110 and a direct memory access DMA controller 120 communicating with each other, and with the memory 100, over a data bus 130. Respective hardware components 62, 72, 82 and 92 implement the decoding module DCR 60, the resizing module RS 70, the transcoding module TCR 80 and the sink module SNK 90 and are connected to the data bus 130. Each of these components has a dedicated memory buffer 102 in the memory 100. The DMA controller 120, enables these components to access the memory buffers 102 directly to read and write content thereto. Further, the hardware components 62, 72, 82 and 92 are able to communicate with each other, to trigger each other to read content from the respective memory buffer 102 and process it in accordance with the usage rules embedded in the content.

For example, the decoding component DCR 62 may write the decoded content to a memory buffer 102 in accordance with the usage rules, for example to the memory buffer 102 for the resizing component RS 72 if there is a usage rule requiring resizing. The resizing component RS 72 may then read its memory buffer 102, resize the content in accordance with the embedded usage rule and write it either to the memory buffer 102 of the sink component SNK 92 if no further content transformation is required by the usage rules as determined by the middleware process coordinating the content pipeline or by the content transformation components themselves, or write it to the memory buffer 102 of another content transformation component, for example the transcoding component TCR 82, which in turn processes the content in accordance with the usage rules in analogous fashion.

In some embodiments, the content handling device 10 comprises a TEE 50 implemented with a separate memory 140, which may either be a physically separate hardware component from the memory 100 or a separate address space of the same physical hardware. The separate memory 140 is accessible via the data bus 130, only via a dedicated input/output IO controller 150. The TEE may further comprise a dedicated processing unit CPU 160, communicating with the separate memory 140 and/or the input/output controller IO 150 over a private data bus 170. In some embodiments, the TEE may not have a dedicated processing unit CPU 160 but solely use the central processing unit 110. The content handling device 10 may further comprise a descrambler hardware component DSC 32 and/or a physical secure element SE 42. These components may be connected to the private data bus 170 and/or to the data bus 130. In some embodiments, the content handling device 10 may not have a secure element SE 42, or may implement the descrambling module DSC 30 in a software process rather than in a dedicated hardware component.

In some embodiments, as described above, the control of the content transformation components is achieved in a daisy chain arrangement in which both the content to be processed and the prompt to start processing is passed from one component to the next component, with both the next destination of the content after transforming the content and the details of the transformation to be applied being derived from the usage rules and/or usage rule tags, as the case may be, or from related information. In other embodiments, the content is passed from one content transformation component to the other by direct writing to appropriate memory buffers as described above, but processing of the content at each content transformation component is coordinated by a separate process.

Figure 3:
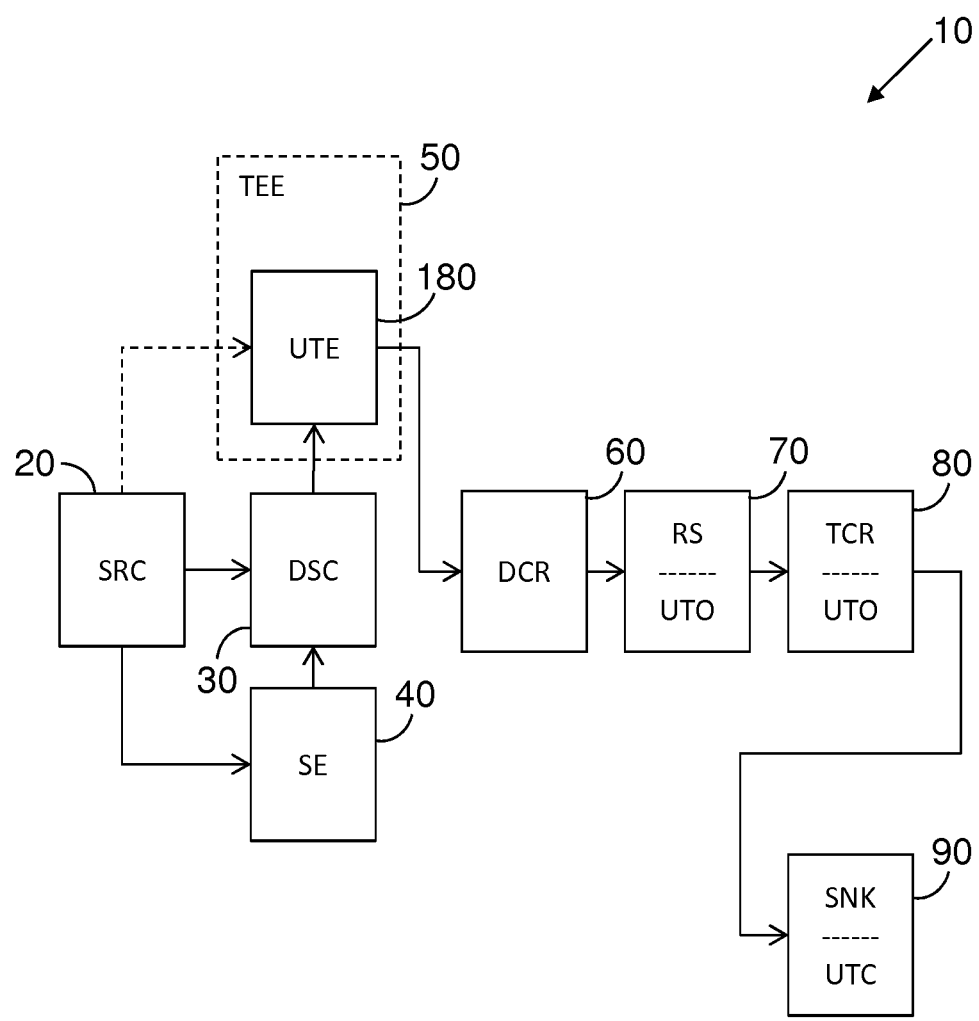
FIGS. 3 to 7 illustrate variations of the content handling device of FIG. 1 and of its hardware implementation illustrated in FIG. 2.

With reference to FIG. 3, in some embodiments, the content may be received without usage rule tags embedded, and usage rule tags may be embedded in these embodiments by the content handling device 10. In these embodiments the content is received with usage rules, for example embedded in the content, received separately or retrieved using information embedded in or provided with the content. In some embodiments, the content handling device 10 comprises a usage rule tag embedding module UTE 180, which is configured to receive usage rules from the source module SRC 20 and descrambled content from the descrambling module DSC 30, and output content with usage rule tags embedded to the video decoding module DCR 60. In some embodiments, rather than receiving usage rules from the source module SRC 20, the usage rule tag embedding module UTE 180 receives usage rules embedded in the content from descrambling module 30. In some embodiments, the usage rule tag embedding module UTE 180 is provided by a software process running inside the TEE 50. A specific hardware implementation of these embodiments provides usage rules tag embedding component UTE 180 as a dedicated hardware component. Embedding of usage rule tags is described in further detail below.

Figure 4:
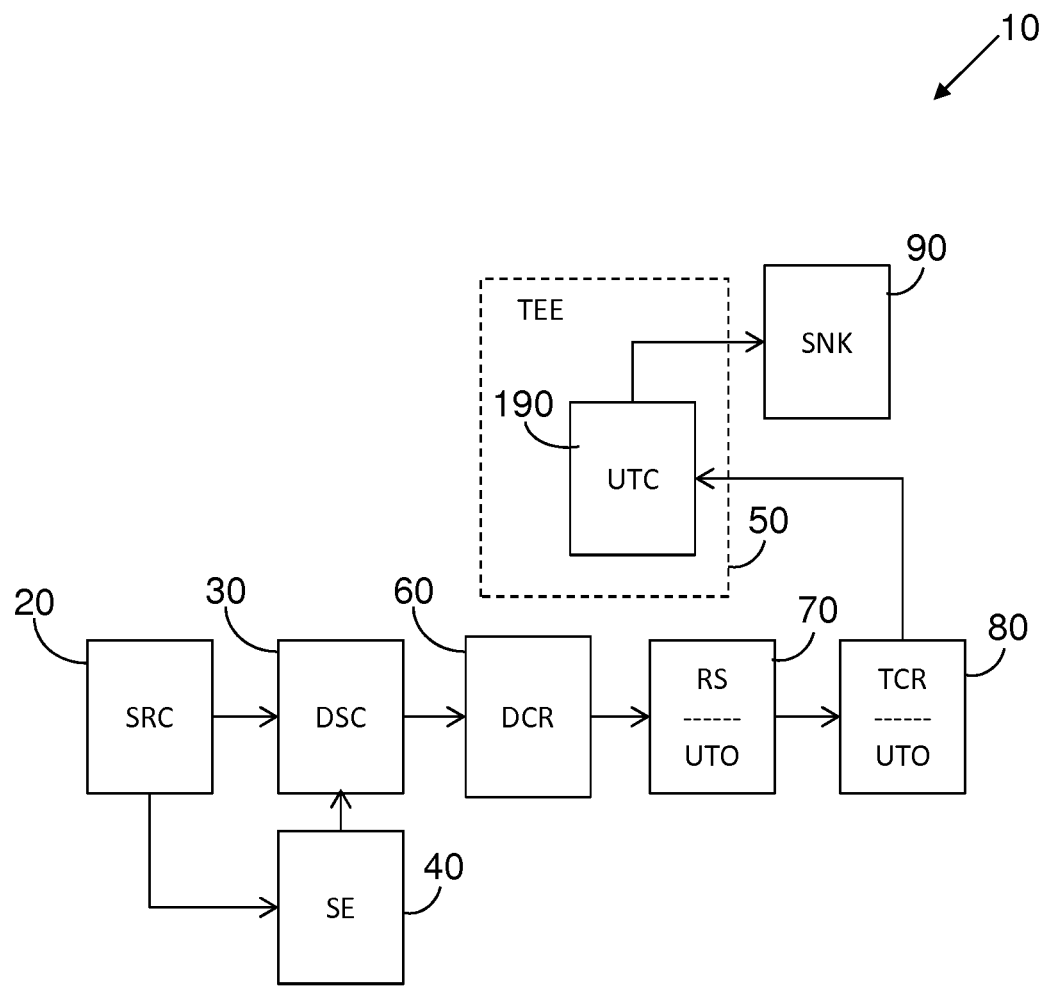
Figure 5:
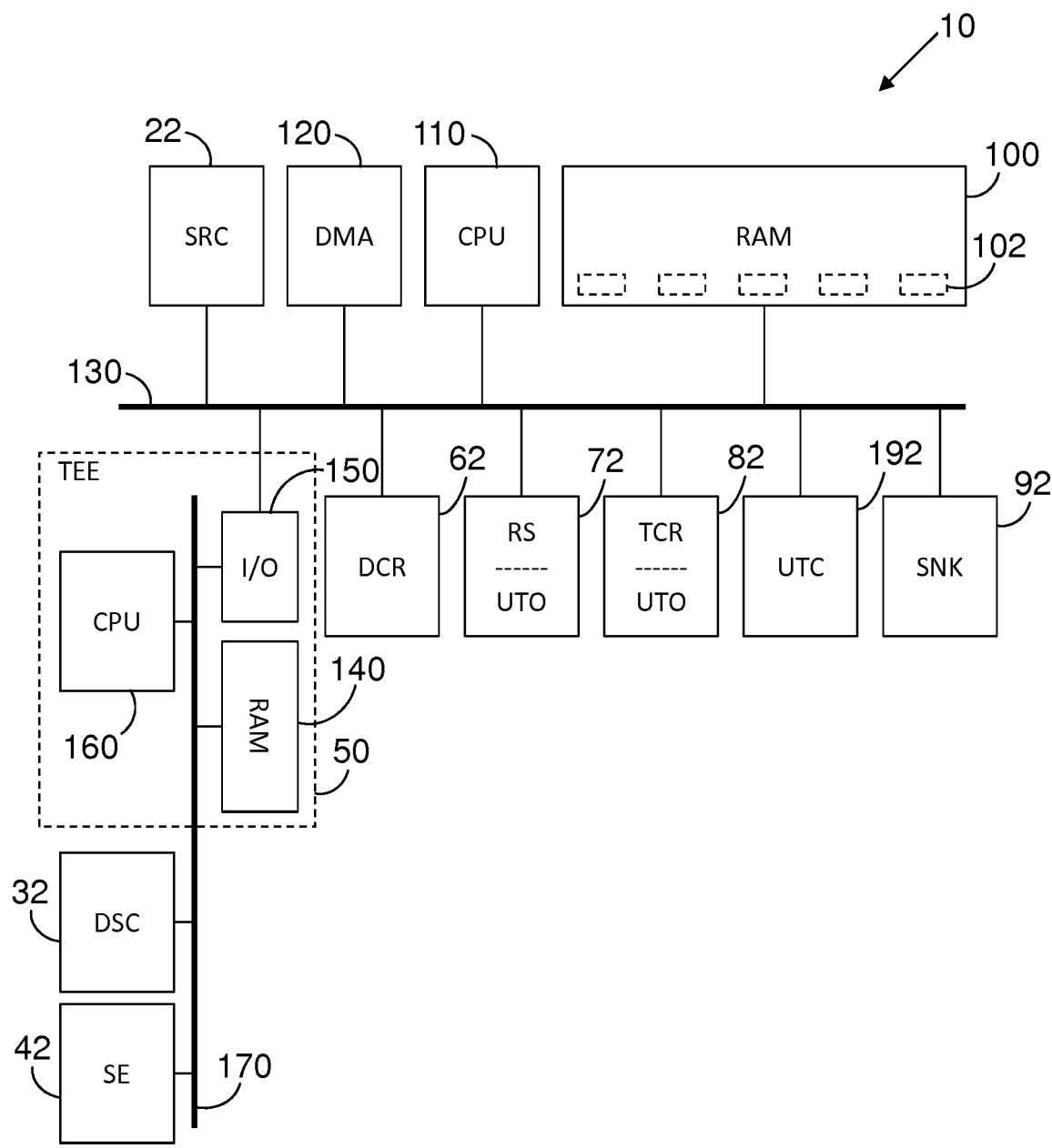
Figure 6:
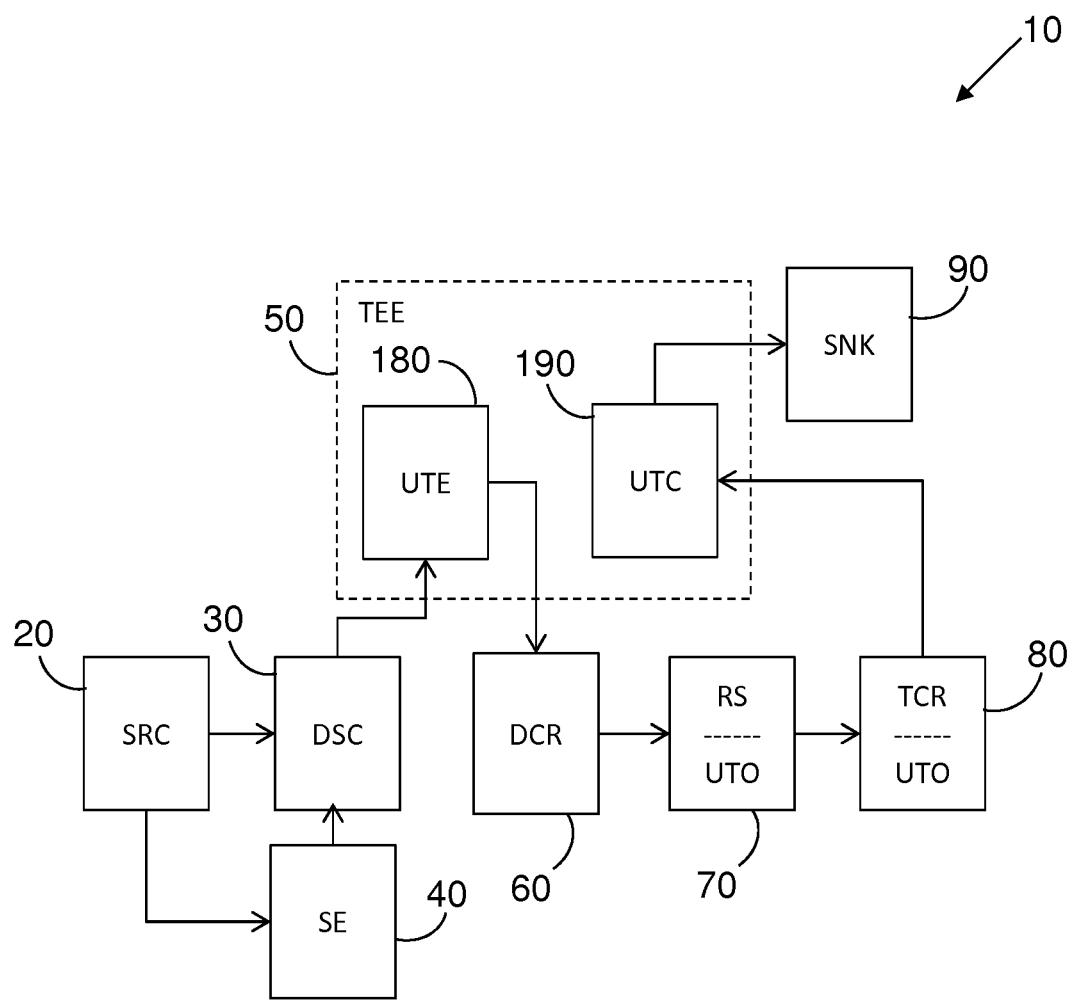

With reference to FIG. 4, in some embodiments, the usage rule tag check is removed from the sink module SNK 90 and is provided in a separate usage rule tag checking module UTC 190. The content handling device 10, in these embodiments, is configured such that all content provided to the sink module SNK 90 is rooted through the usage rule tag checking module UTC 190. In some embodiments, the usage rules tag checking module UTC 190 is implemented in the TEE 50, as illustrated in FIG. 4. In other embodiments, it is implemented as a separate hardware component. A particular hardware implementation of such embodiments, with a separate usage rules tag checking hardware component UTC 192 is illustrated in FIG. 5. Embodiments with both usage rule tag embedding and checking modules UTE 180, UTC 190 implemented as a process in the TEE are illustrated in FIG. 6. It will be appreciated that in some embodiments, both these modules may be implemented in hardware.

Figure 7:
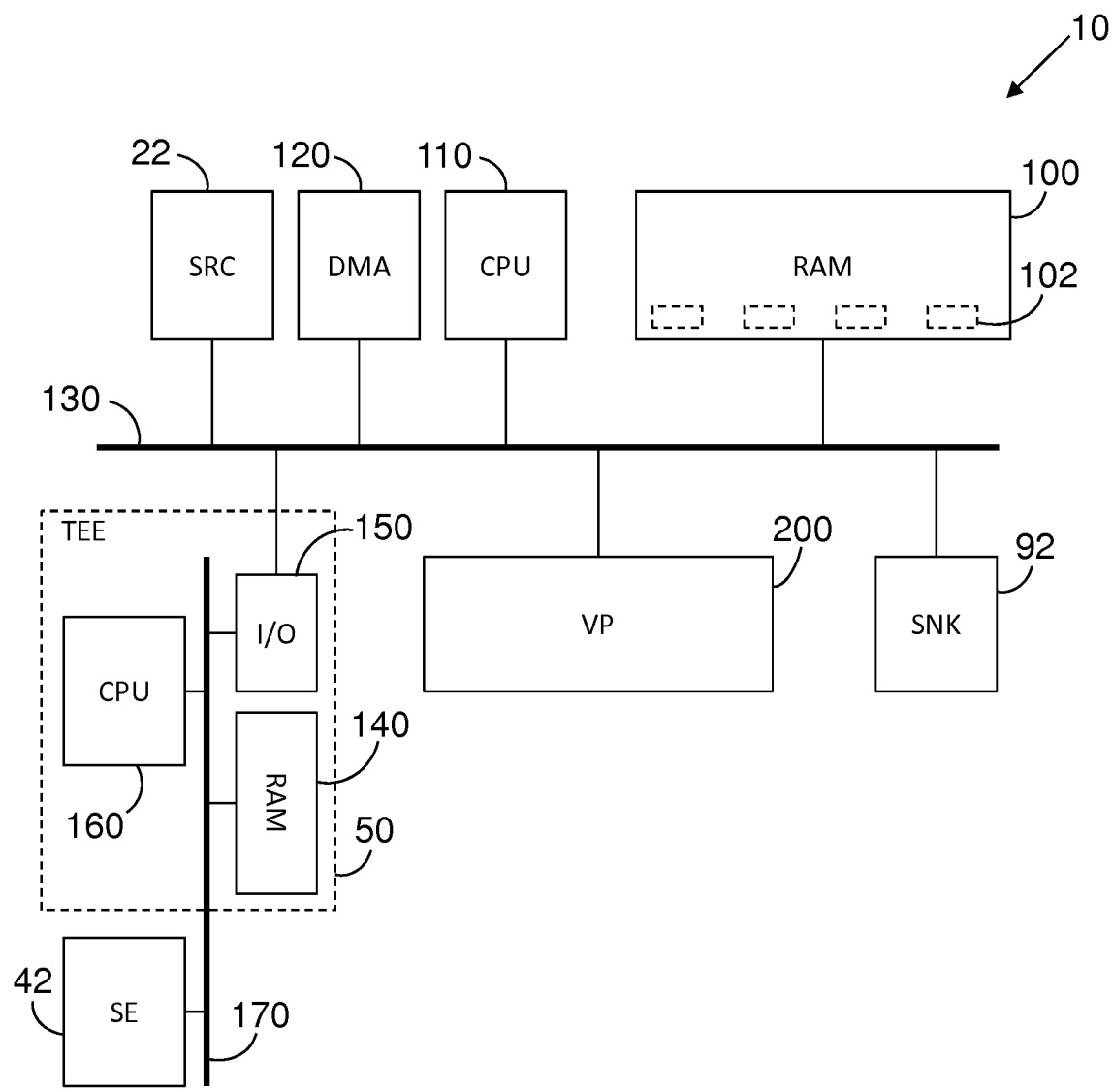

The embodiments, described above differ in the modules present, for example in dependence upon whether usage rule tags are embedded locally at the device or whether the content is received with these tags already embedded, and how functionality is implemented, for example, whether usage rules a tag check and output functionality is combined in one module or whether separate modules are provided for each of these functions. It will be appreciated that these differences are independent of each other and that therefore the present disclosure extends to combinations of any of these differences, for example embodiments in which usage rule tags are embedded locally and the functionality of a usage rule tag check and outputting content is split between separate modules. Likewise, any of the modules discussed above may be implemented in software, either in the main operating system environment of the device or in a TEE, or in dedicated hardware components, or in any combination thereof. For example, in some embodiments, one, two or more content transformation modules may be implemented in software, in general purpose hardware inside or outside a TEE. Content transformation modules may be implemented in respective dedicated hardware components, or relying on a dedicated hardware component providing a shared resource for a number of content transformation modules, such as a video processor providing hardware acceleration. An example of such embodiments is illustrated in FIG. 7, in which the decoder component DCR 62, the resizing component 72 and the transcoding component 82 are replaced by a video processor VP 200.

Figure 8:
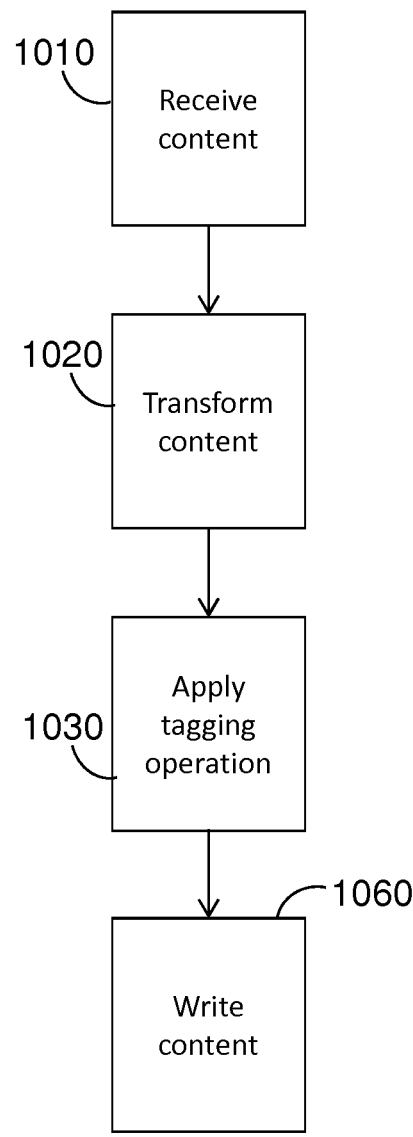
FIGS. 8 to 10 illustrate processes implemented by content transformation modules of the content handling device.

A method implemented by some embodiments of content transformation modules, for example, the resizing module RS 70 or the transcoding module TCR 80 is now described with reference to FIG. 8. At a step 1010, a content transformation module receives content, for example from a video decoding module or from another content transforming module, together with usage rules and/or usage rule tags. Specifically, the content transformation module may read a memory buffer where an upstream module has written the content, usage rules and/or usage rule tags. In some embodiments, the usage rules and/or usage rule tags are embedded in the content, while in another embodiment they are received by the content transformation module separately. At step a 1020, the content is transformed by the content transformation module in accordance with the usage rules/usage rule tag. For example, if the usage rules specify a certain resizing operation for the content and the content transformation module in question is a resizing modules, the content transformation module resizes the content accordingly.

At a step 1030, the content transformation module applies a tagging operation to the content. In embodiments where the content is received by the content transformation module without a usage rule tag, the tagging operation may be to add a usage rule tag corresponding to a usage rule relevant to the content transformation module and indicating that the relevant usage rule has been complied with.

Figure 9:
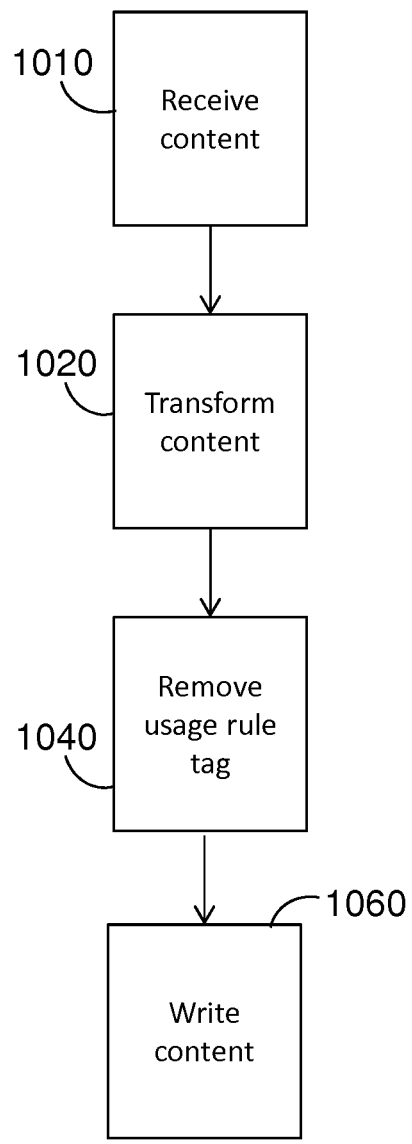

With reference to FIG. 9, in which steps 1010 and 1020 are identical to those described above with reference to FIG. 8, in embodiments in which the content is received by the content transformation module with embedded usage rule tags, the tagging operation may be to remove the usage rule tag corresponding to the relevant usage rule at a step 1040 to indicate that the relevant usage rule has been complied with. Alternatively, in some embodiments, the usage rule tag may be modified instead to indicate compliance with the usage rule. In embodiments in which content is received with usage rule tags embedded and they are removed or modified by the content transformation components, the presence of unmodified usage rule tags indicates the content has not been handled in accordance with the content pipeline prescribed by the usage rules, even if the content can be extracted from the content handling device 10. This allows non-compliant content to be identified. Further, in embodiments in which the usage rule tags are specific to the content handling device in question, for example forensic usage rule tags, not only can non-compliant content be identified but the source of the non-compliant content can also be identified using the forensic usage rule tags, to enable traitor tracing.

Figure 10:
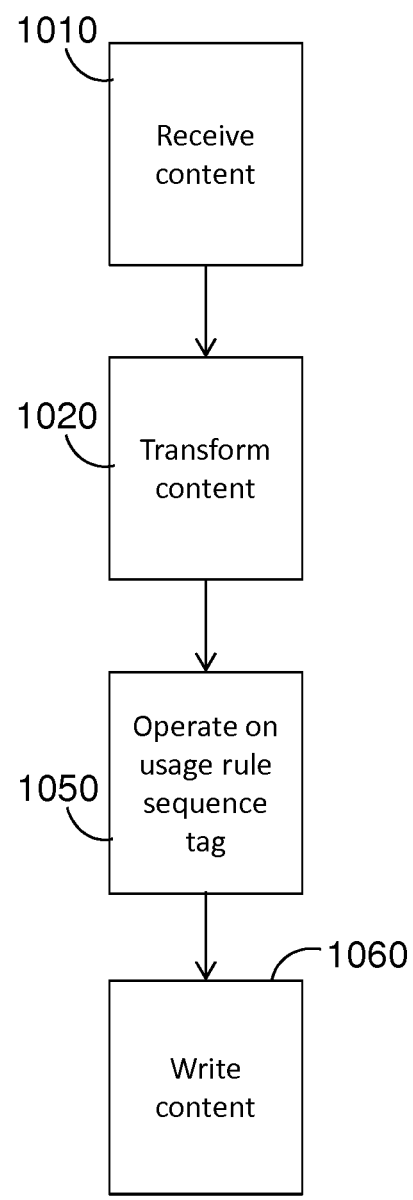

Whether usage rule tags are embedded locally or are received with the content, in some embodiments, a usage rule specifies a certain sequence of transformations that has to be applied in the specified sequence. In such embodiments, a usage rule sequence tag is embedded in the content and each content transformation module in the sequence operates on the usage rule sequence tag, as illustrated in FIG. 10 at step 1050. In some embodiments, the cumulative effect of each content transformation module operating on the usage rule sequence tag in the right sequence is to remove the usage rule sequence tag from the content, indicating that the usage rules have been applied in the correct sequence.

In any of the embodiments described above with reference to any of FIG. 8, 9 or 10, subsequent to transforming the content and applying the tagging operation, the content is output at a step 1060, for example written to a memory buffer associated with a downstream module such as another content transformation module or the sink module, or to a central buffer accessible by two or more modules. It will be understood that steps 1010 may comprise receiving a signal to start processing from an upstream module or a central process and that step 1060 may comprise sending a signal to start processing content to a downstream module or to send an interrupt returning control to a central process.

Figure 11:
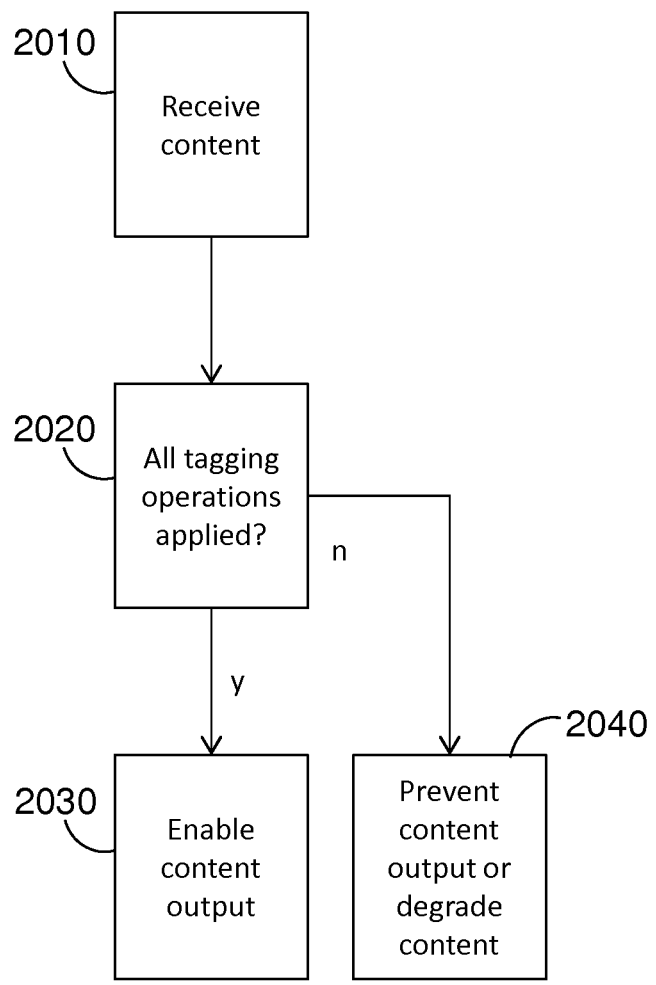
FIGS. 11 and 12 illustrate processes implemented by a usage rule tag checking module of the content handling device.

Turning now to the operation of the usage tag checking functionality described above, whether implemented in the sink module SNK 90 or in the separate usage rule tag checking module UTC 190, with reference to FIG. 11, the sink module SNK 90 or usage rule tag checking module UTC 190, as applicable, referred to in this context, as "the module", receives the content at a step 2010. At a step 2020, the module checks if all tagging operations have been applied and if so, enables the content to be output by the sink module SNK 90 at a step 2030. If the determination at step 2020 is negative, that is, it is determined that not all tagging operations have been applied, the module prevents the output of the content at a step 2014, or degrades the content before allowing its output, in dependence on the usage rule compliance policy enforced by the system.

Figure 12:
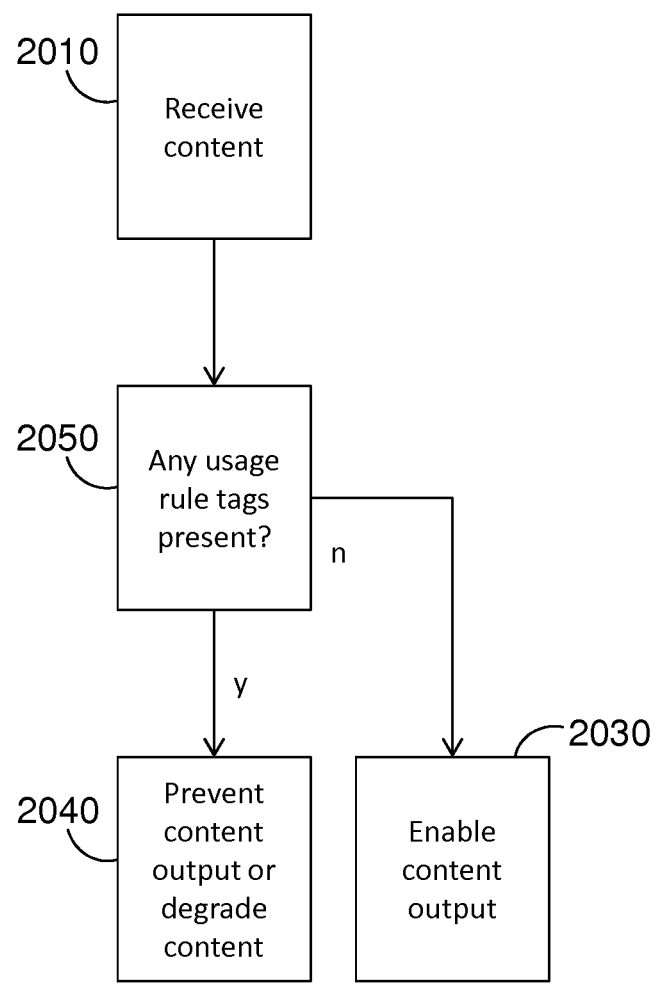

As described above, in some embodiments, the tagging operation comprises removing a corresponding usage rule tag from the content. In such embodiments, with reference to FIG. 12, the step 2020 is replaced by a step 2050 of checking whether any usage rule tags are present before outputting the content. If this determination is negative, that is all usage rule tags have been removed from the content, content output is enabled in step 2030, as described above. Otherwise, if the determination is positive, that is any usage rule tags remain, content output is prevented or the content is degraded before being output as described above. At step 2040 described above, in some embodiments, usage rule tags are modified to a different tag from that which is received and it will be understood that this is equivalent to removing the usage rule tag, i.e. the tag received or embedded to represent the need for a transformation in accordance with a corresponding usage rule. It will be understood that the check in step 2050, in these embodiments, is for the absence of any usage rule tags as received or embedded, rather than for the absence of any tags whatsoever. In that sense, modifying a usage rule tag is equivalent to removing it.

Figure 13:
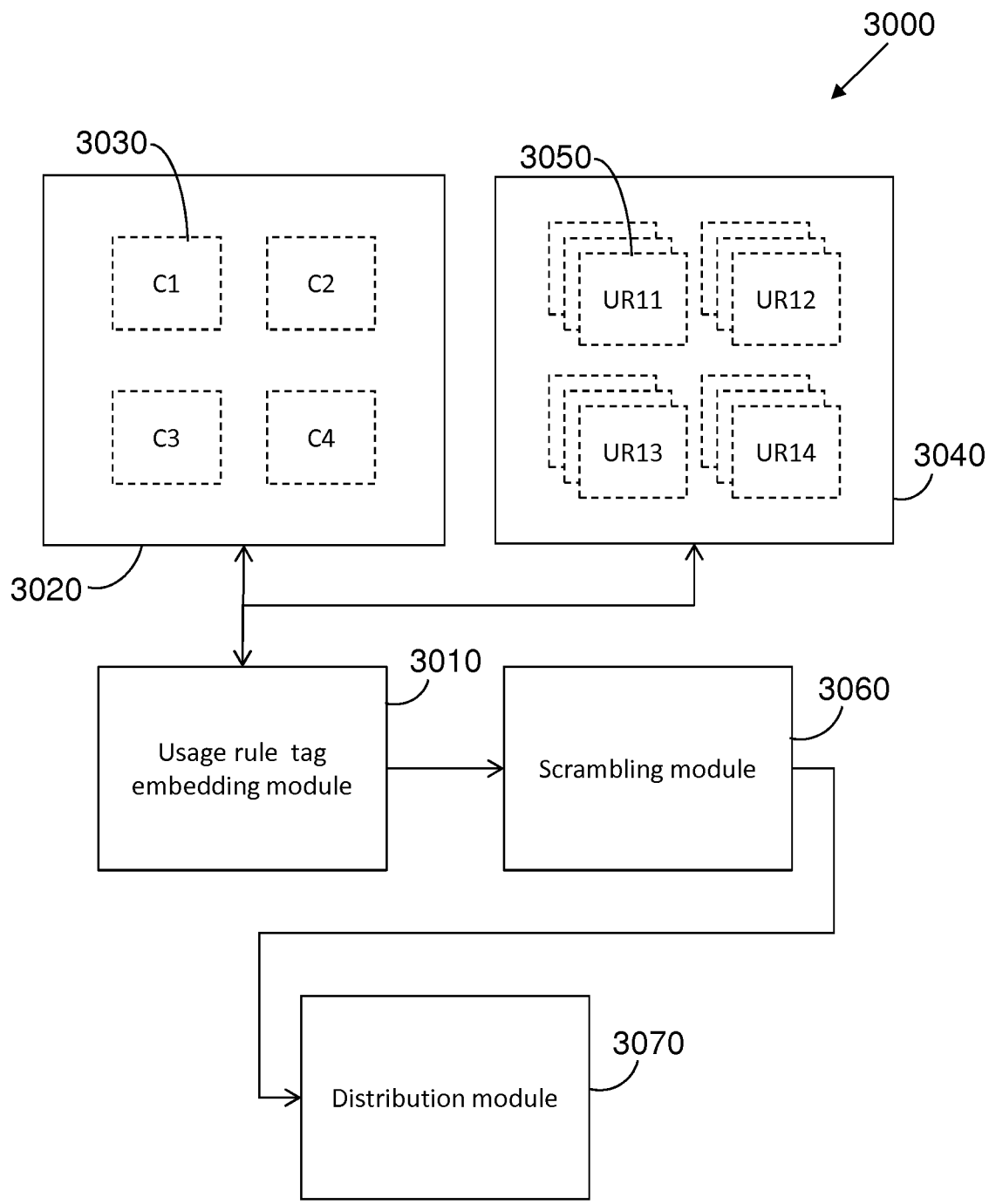
FIG. 13 illustrates a content distribution system.

As described above, in some embodiments, content is received by the content handling device 10 without usage rules embedded and the content handling device 10 embeds one or more usage rule tags, corresponding to the usage rules. In other embodiments, the content is received at the content handling device 10 with the usage rule tags embedded. With reference to FIG. 13, a content distribution system 3000 for distributing content with embedded usage rule tags is now described. A usage rule tag embedding module 3010 is coupled to a content store 3020, for example provided on the same or separate hardware as the usage rule tag embedding module 3010, for example on a separate server, data centre or cloud storage. The content store 3020 stores one or more content items 3030, for example, one or more MPEG video streams. The usage rule tag embedding module is also coupled to a usage rule store 3040, for example provided on the same or separate hardware as the usage rule tag embedding module, for example on a separate server, data centre or cloud storage. The usage rule store 3040 comprises one or more respective sets of one or more usage rules 3050 corresponding to the content items 3030. In other embodiments, the usage rule tag embedding module 3010 receives content already embedded with usage rules.

The usage rule tag embedding module 3010 is configured to receive the content items and usage rules either separately or embedded, and to produce one or more usage rule tags, corresponding to usage rules. The usage rule tag embedding module 3010 is further configured to embed the usage rule tags in the content. Where the content is received with usage rules embedded, the usage rule tag embedding module may be configured to strip out the usage rules as redundant, or they may remain in the content. Likewise, where the content is received separately from the usage rules, the usage rule tag embedding module may or may not embed the usage rules in the content in addition to the usage rule tags.

A scrambling module 3060 is coupled to the usage rule tag embedding module 3010 and is configured to receive content with embedded usage rule tags and, where applicable, usage rules from the usage rule tag embedding module 3010 and to scramble the content together with any embedded tags and rules. A distribution module 3070 is coupled to the scrambling module 3060 and configured to receive the scrambled content from the scrambling module 3060 and to distribute the scrambled content. For example, the distribution module 3070 may be a video server to serve the scrambled content over the Internet, for example in the form of an MPEG video stream. Equally, the distribution module may implement or comprise a head end arrangement for distributing content by broadcast, for example over cable, satellite or over the air. It will be understood that where the content is distributed in clear form, that is not scrambled, the scrambling module 3060 is omitted and the distribution module 3070 is coupled directly to the embedding module 3010.

Figure 14:
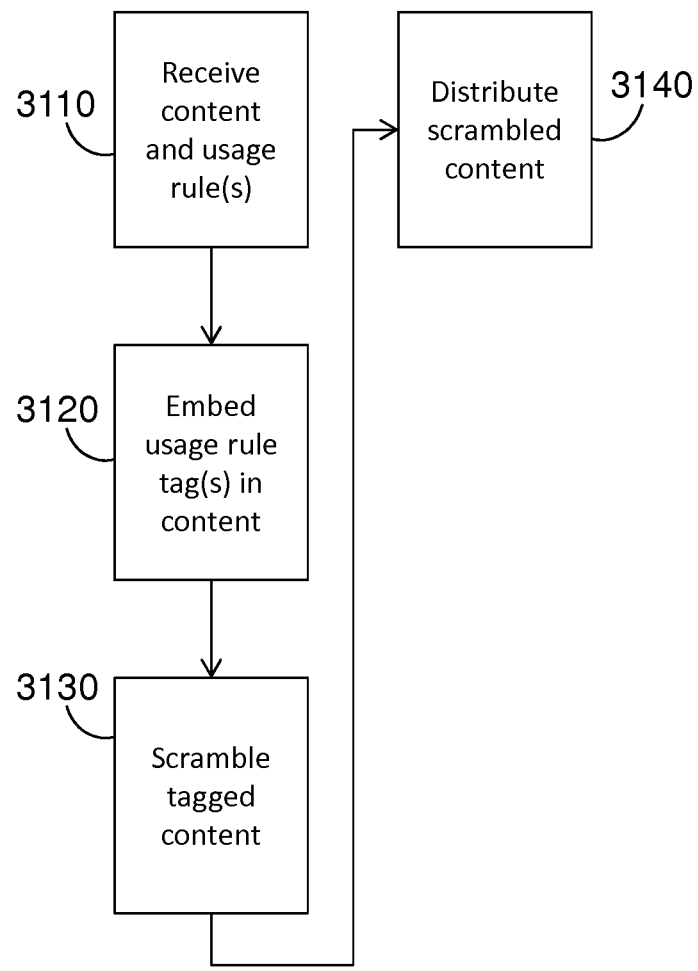
FIG. 14 illustrates a process implemented by the content distribution system.

A process for distributing content with embedded usage rule tags, for example with a content distribution system 3000 as described above, is illustrated in FIG. 14. At a step 3110, content and usage rules are received, either separately or with usage rules embedded in the content as described above. At a step 3120, the usage rule tags are embedded in the content. Additionally, usage rules may be embedded or removed from the content, as applicable. Usage rules may be embedded in the content in ECM data and remain in clear text when the content is scrambled. At a step 3130, the tagged content is scrambled and distributed at a step 3140.

Figure 15:
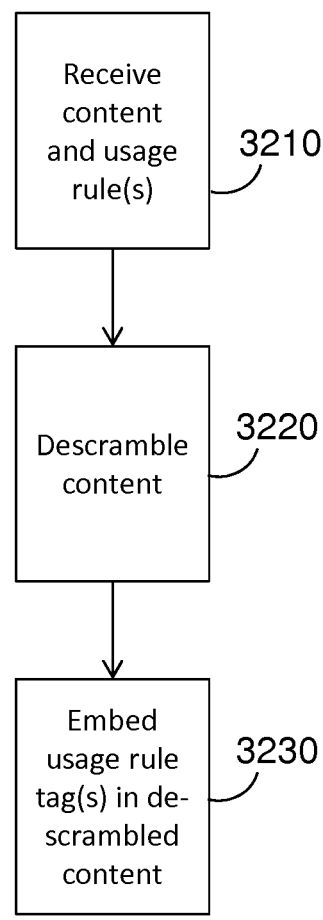
FIG. 15 illustrates a process implemented by a usage rule tag embedding module of the content handling device.

With reference to FIG. 15, a process for embedding usage rule tags at the content handling device 10 comprises a first step 3210 of receiving the content and usage rules, either separately or with the usage rules embedded in the content. At a step 3220, in embodiments where the content is scrambled, the content is descrambled. Typically, the usage rules are provided in the ECM data unscrambled. In some embodiments, the usage rules are digitally signed so that their integrity and authenticity can be checked by verifying the digital signature. In embodiments where the usage rules are scrambled, they are descrambled together with the content at step 3220. At a step 3230, one or more usage rule tags are produced, corresponding to the usage rules and are embedded in the descrambled content.

With reference to FIG. 16, various embodiments of usage rule tags and corresponding tagging operations and usage rule tag checks are now described and it will be understood that each can be combined with any of the embodiments described above for the content handling device 10 and the content distribution system 3000, in particular irrespective of whether usage rule tags are generated at the content distribution system 3000 or at the content handling device 10.

In some embodiments, there is a one-to-one correspondence between each usage rule and the associated transformation and a corresponding usage rule tag. In these embodiments, as each content transformation module applies the corresponding transformations, it applies a corresponding tagging operation to a respective usage rule tag, for example, removing the tag either by deleting it, or modifying it to turn it into a different tag.

In other embodiments, which may be combined with the previous embodiment, two or more usage rules have a single corresponding usage rule tag. In these embodiments, each content transformation module, corresponding to a respective transformation associated with the usage rules associated with the single corresponding usage rule tag, applies the tagging operation to this single usage rule tag. The combined effect of applying the operations for all the usage rules/transformations to the single usage rule tag is to remove the single usage rule tag or to modify it such that is no longer recognised as a usage rule tag. In some embodiments, a single usage rule tag corresponds to a defined sequence of transformations, corresponding to a defined sequence of usage rules or a single usage rule representing the sequence. The combined effect of the relevant tagging operations, in these embodiments, is to remove by deletion or modification, as described above, the single usage rule tag but only if the operations are applied in the correct sequence. For example the usage rule tag may correspond to a first tag corresponding to the last transformation in the sequence to which a non-associative, non-commutative tagging operation is applied for the penultimate and earlier transformations in the sequence. The tagging operations for this sequence correspond to the respective inverse operation of the tagging operations. In some embodiments, the operations may be associative and/or communicative, so that the order of operations does not matter.

In any of the above embodiments, the usage rule tag itself may take a number of forms. For example, the usage rule tag may be a data string, for example a binary or hex string, a video watermark, a function applied to the content or indeed the usage rule itself. A data string acting as a usage rule tag may, in the example of an MPEG stream, be embedded in a Packetized Elementary Stream PES header or in a non-video-coding Network Abstraction Layer NAL unit of the stream. The tagging operation for a data string may be to remove the tag, for example by deleting the tag, overwriting the tag with a string of zeros, or by overwriting the tag with a known string that indicates that the transformation has been applied. The usage rule tag check then checks that all tags have been removed by searching for the presence of any usage rule tags. In some embodiments, the usage rule tags are pre-agreed and made known to the device manufacturer by a usage rule tag inserter if inserted remotely. In some embodiments the tags are of a type that can be readily found without knowing the specific content of the tag, for example embedded watermarks or overlays with letters and/or numbers or other symbols or graphics.

For example, the usage rule tag may be a watermark applied to the video data. In the example of a MPEG stream, the tag may thus be applied to one or more video-coding NAL units of the video stream. A corresponding tagging operation is to remove the watermark for each transformation as a transformation is applied, with a corresponding usage rule tag check of checking that all watermarks have been removed. Where the watermark is a visible watermark, for example, one degrading the video content, an additional level of security is introduced. In particular, if the usage rule tag check is overridden and the content is output in spite of the required transformations not having been applied, the output content will have the visible watermark present and will thus be less valuable to a pirate. For example, the watermark may be a visible watermark changing the luminosity of a certain amount of pixels in a pre-agreed image area, for example the top-right 50 square pixels, or similar.

In embodiments where the tag is a data string or a watermark, the string or watermark may be a forensic in that it uniquely identifies the content handling device, in particular in embodiments in which usage rule tags are embedded at the content handling device. For example, the string or watermark may be encoded with information from which a unique device ID and possibly a timestamp can be derived. In other embodiments, a forensic string or watermark may comprise information from which an IP address to which a stream was sent, a MAC address or another item of identifying information can be derived.

In some embodiments, the usage rule tag is represented by a function applied to the content, the function being applied to all or part of the content. In these embodiments, the tagging operation consists in the application of the inverse of the functioning question. The operations may be one or both of associative or communicative, or neither. A usage rule tag check is implemented in these embodiments by verifying that the original content has been recovered by the inverse operation(s). Examples of such operations may for example comprise the overlaying of a visible watermark changing the luminosity of a certain amount of pixels in a pre-agreed image area, for example the top-right 50 square pixels, or similar.

FIGS. 2, 5 and 7 illustrate block diagrams of implementations of a content handling device 10 within which a set of instructions, for causing the content handling device to perform any one or more of the methodologies discussed herein, may be executed. The content handling device 10 may be connected, e.g., networked, to other machines in a Local Area Network LAN, an intranet, an extranet, or the Internet. Further, while only a single content handling device 10 is illustrated, the term "content handling device" shall also be taken to include any collection of machines, e.g., computers, that individually or jointly execute a set or multiple sets of instructions to perform any one or more of the methodologies discussed herein.

The content handling device 10 includes the processing device 110, the main memory 100 e.g. a read-only memory ROM, a flash memory, a dynamic random access memory DRAM such as synchronous DRAM SDRAM or Rambus DRAM RDRAM, etc., and may also include a static memory, e.g. a flash memory, a static random access memory SRAM, etc., and a secondary memory, e.g. a data storage device, all of which communicate with each other via bus 130.

The processing device 110 represents one or more general-purpose processors such as a microprocessor, central processing unit, or the like. More particularly, the processing device may be a complex instruction set computing CISC microprocessor, reduced instruction set computing RISC microprocessor, very long instruction word VLIW microprocessor, processor implementing other instruction sets, or processors implementing a combination of instruction sets. The processing device 110 may also be one or more special-purpose processing devices such as an application specific integrated circuit ASIC, a field programmable gate array FPGA, a digital signal processor DSP, a network processor, or the like. The processing device 110 is configured to execute the processing logic for performing the operations and steps discussed herein.

The content handling device 10 may further include a network interface device as part of or in addition to the source component 22. The content handling device 10 also may include one or more of a video display unit, e.g. a liquid crystal display LCD or a cathode ray tube CRT, an alphanumeric input device, e.g. a keyboard or touchscreen, a cursor control device, e.g., a mouse or touchscreen, and an audio device XX16, e.g. a speaker.

Data storage devices may include one or more machine-readable storage media or more specifically one or more non-transitory computer-readable storage media on which is stored one or more sets of instructions embodying any one or more of the methodologies or functions described herein. The instructions may also reside, completely or at least partially, within the main memory 100 and/or within the processing device 110 during execution thereof by the content handling device, the main memory 100 and the processing device 110 also constituting computer-readable storage media.

It will be understood that the above discussion of components of the content handling device 10 equally applies to the content distribution system 3000.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as a semiconductor or solid state memory, a magnetic tape, a removable computer diskette, a random access memory RAM, a read-only memory ROM, a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices as part of an individualization server.

A "hardware component" is a tangible, e.g. non-transitory, physical component, e.g. a set of one or more processors, capable of performing certain operations and may be configured or arranged in a certain physical manner. A hardware component may include dedicated circuitry or logic that is permanently configured to perform certain operations. A hardware component may be or include a special-purpose processor, such as a FPGA or an ASIC. A hardware component may also include programmable logic or circuitry that is temporarily configured by software to perform certain operations.

Accordingly, the phrase "hardware component" should be understood to encompass a tangible entity that may be physically constructed, permanently configured, e.g. hardwired, or temporarily configured, e.g. programmed, to operate in a certain manner or to perform certain operations described herein.

In addition, the modules and components can be implemented as firmware or functional circuitry within hardware devices. Further, the modules and components can be implemented in any combination of hardware devices and software components, or only in software, e.g. code stored or otherwise embodied in a machine-readable medium or in a transmission medium.

Unless specifically stated otherwise, as apparent from the following discussion, it is appreciated that throughout the description, discussions utilizing terms such as "receiving", "determining", "checking", "embedding", "applying", "providing", "enabling" or the like, refer to the actions and processes of the content handling device 10, content distribution system 3000, a computer system, or similar electronic computing device, that manipulates and transforms data, such as a content, for example provided as a video stream such as a MPEG stream, usage rules, usage rule tags, etc., represented as physical electronic quantities within the computer system's registers and memories into other data similarly represented as physical quantities within the computer system memories or registers or other such information storage, transmission or display devices. It will be understood that "embedding" includes such operations as adding data to or modifying the data, for example a video stream, or to apply a function, such as an associative or communicative operation, to the data.

The following embodiments are disclosed:
1. A content handling device comprising a content source module for receiving content, a content sink module for outputting content and a plurality of content transformation modules defining one or more paths from the content source module to the content sink module, wherein the content is associated with one or more usage rules requiring one or more transformations to be applied to the content and each content transformation module is configured to:
   receive the content;
   apply a transformation to the content in accordance with the usage rules; and
   apply a tagging operation corresponding to the transformation to the content.
2. A content handling device according to item 1, wherein the device comprises a usage rule tag checking module configured to:
   receive the content;
   determine whether all tagging operations corresponding to transformations required by the one or more usage rules have been applied to the content;
   responsive to the determination being positive, enabling the content to be output by the content sink module; and
   responsive to the determination being negative, degrading or blocking output of the content.
3. A content handling device according to item 2, wherein each content transformation module is configured to operate with the tagging operation on a usage rule tag embedded in the content and the combined effect of the tagging operations corresponding to the one or more usage rules is to remove all usage rule tags from the content, and
   the usage rule tag checking module is configured to determine whether all tagging operations corresponding to transformations required by the one or more usage rules have been applied to the content by determining whether no usage rule tag is present in the content.
4. A content handling device according to item 1, wherein each content transformation module is configured to operate with the tagging operation on a usage rule tag embedded in the content and the combined effect the tagging operations corresponding to the one or more usage rules is to remove all usage rule tags from the content.

5. A content handling device according to item 3 or 4, wherein each usage rule has a corresponding usage rule tag and the tagging operation comprises removing a respective usage rule tag from the content.
6. A content handling device according to item 3 or 4, wherein a usage rule sequence tag is associated with usage rule requiring a sequence of transformations and the combined effect of operating on the usage rule sequence tag with a corresponding sequence of tagging operations is to remove the usage rule sequence tag.
7. A content handling device according to any one of items 3 to 6, wherein each usage rule tag comprises a watermark or the usage rule tags form a watermark.
8. A content handling device according to item 7 wherein the watermark is visible when playing back the content.
9. A content handling device according to item 7 or 8, wherein the watermark is a forensic watermark from which the content handling device can be identified.
10. A content handling device according to any preceding item, the device comprising a usage tag embedding module configured to:
    receive the one or more usage rules together with the content;
    read the usage rules; and
    embed one or more usage rules tags corresponding to the one or more usage rules in the content.
11. A content handling device according to any preceding item, the device comprising a descrambler module coupled to the content source module to descramble received content together with the one or more usage rules and/or usage rule tags.
12. A content handling device according to any preceding item, wherein one, some or all of the modules are implemented in respective dedicated hardware.
13. A content handling device according to any preceding item, wherein one or more of the modules are implemented in a TEE.
14. A content distribution system comprising
    storage for storing content to be distributed and one or more associated usage rules;
    a processor configured to process the content to be distributed to embed one or more usage rule tags in the content to be distributed.
15. A content distribution system according to item 14, wherein the processor is configured to embed a usage rule tag corresponding to a usage rule, a usage rule tag corresponding to a sequence of usage rules, and/or a usage rule tag corresponding to an unordered set of usage rules.
16. A content handling method, implemented by a content handling device, for handling content associated with one or more usage rules requiring one or more transformations to be applied to the content, the method comprising:
    applying a transformation to the content in accordance with the usage rules; and
    applying a tagging operation corresponding to the transformation to the content.
17. A method according to item 16, the method comprising:
    determining whether all tagging operations corresponding to transformations required by the one or more usage rules have been applied to the content;
    responsive to the determination being positive, enabling the content to be output by the content handling device; and
    responsive to the determination being negative, degrading or blocking output of the content.
18. A method according to item 17, the method comprising
    operating with each tagging operation on a usage rule tag embedded in the content,
        i. wherein he combined effect the tagging operations corresponding to the one or more usage rules is to remove all usage rule tags from the content and
        ii. wherein determining whether all tagging operations corresponding to transformations required by the one or more usage rules have been applied to the content comprises determining whether no usage rule tag is present in the content.
19. A method according to item 16, wherein each content transformation module is configured to operate with the tagging operation on a usage rule tag embedded in the content and the combined effect the tagging operations corresponding to the one or more usage rules is to remove all usage rule tags from the content.
20. A method according to item 18 or 19, wherein each usage rule has a corresponding usage rule tag and the tagging operation comprises removing a respective usage rule tag from the content.
21. A method according to item 18 or 19, wherein a usage rule sequence tag is associated with usage rule requiring a sequence of transformations and the combined effect of operating on the usage rule sequence tag with a corresponding sequence of tagging operations is to remove the usage rule sequence tag.
22. A method according to any one of items 18 to 21, wherein each usage rule tag comprises a watermark or the usage rule tags form a watermark.
23. A method according to item 22, wherein the watermark is visible when playing back the content.
24. A method according to item 22 or 23, wherein the watermark is a forensic watermark from which the content handling device can be identified.
25. A method according any one of items 16 to 24, the method comprising:
    receiving the one or more usage rules together with the content;
    reading the usage rules; and
    embedding one or more usage rules tags corresponding to the one or more usage rules in the content.
26. A method according to any one of items 16 to 25, the method comprising descrambling received content together with the one or more usage rules and/or usage rule tags.
27. A method according to any one of items 16 to 26, wherein each tagging operation is implemented by dedicated hardware that also implements the corresponding content transformation.
28. A content distribution method comprising processing content to be distributed to embed one or more usage rule tags associated with one more usage rules in the content to be distributed.
29. A method according to item 28, wherein the processor is configured to embed a usage rule tag corresponding to a usage rule, a usage rule tag corresponding to a sequence of usage rules, and/or a usage rule tag corresponding to an unordered set of usage rules.
30. A computer program product comprising coded instructions that, when executed on a computing device, implement a method according to any one of items 16 to 29.

31. One or more tangible non-transitory computer-readable media encoding coded instructions that, when executed on a computing device, implement a method according to any one of items 16 to 29.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims.

Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A content handling device comprising;
a content source module for receiving content;
a content sink module for outputting the content;
a plurality of content transformation modules defining one or more paths from the content source module to the content sink module, wherein the content is associated with one or more usage rules requiring one or more transformations to be applied to the content and each content transformation module is configured to:
   receive the content,
   apply a transformation to the content in accordance with the usage rules, and
   apply a tagging operation corresponding to the transformation to the content; and
a usage rule tag checking module configured to:
   receive the content,
   determine whether all tagging operations corresponding to transformations required by the one or more usage rules have been applied to the content,
   responsive to the determination being positive, enable the content to be output by the content sink module, and
   responsive to the determination being negative, degrade or block output of the content.

2. The content handling device according to claim 1, wherein
each content transformation module is configured to operate with the tagging operation on a usage rule tag embedded in the content and a combined effect of the tagging operations corresponding to the one or more usage rules is to remove all usage rule tags from the content, and
the usage rule tag checking module is configured to determine whether all tagging operations corresponding to transformations required by the one or more usage rules have been applied to the content by determining whether no usage rule tag is present in the content.

3. The content handling device according to claim 1, wherein each content transformation module is configured to operate with the tagging operation on a usage rule tag embedded in the content and the combined effect the tagging operations corresponding to the one or more usage rules is to remove all usage rule tags from the content.

4. The content handling device according to claim 2, wherein each usage rule has a corresponding usage rule tag and the tagging operation comprises removing a respective usage rule tag from the content.

5. The content handling device according to claim 2, wherein a usage rule sequence tag is associated with usage rule requiring a sequence of transformations and the combined effect of operating on the usage rule sequence tag with a corresponding sequence of tagging operations is to remove the usage rule sequence tag.

6. The content handling device according to claim 2, wherein each usage rule tag comprises a watermark or the usage rule tags form a watermark.

7. The content handling device according to claim 6, wherein the watermark is visible when playing back the content.

8. The content handling device according to claim 6, wherein the watermark is a forensic watermark from which the content handling device can be identified.

9. The content handling device according to claim 1, further comprising a usage tag embedding module configured to:
   receive the one or more usage rules together with the content;
   read the usage rules; and
   embed one or more usage rules tags corresponding to the one or more usage rules in the content.

10. The content handling device according to claim 1, wherein one, or all of the modules are implemented in respective dedicated hardware.

11. A content handling method, implemented by a content handling device, for handling content associated with one or more usage rules requiring one or more transformations to be applied to the content, the method comprising:
   applying a transformation to the content in accordance with the usage rules;
   applying a tagging operation corresponding to the transformation to the content;
   determining whether all tagging operations corresponding to transformations required by the one or more usage rules have been applied to the content;
   responsive to the determination being positive, enabling the content to be output by the content handling device; and
   responsive to the determination being negative, degrading or blocking output of the content.

12. The method according to claim 11, further comprising:
   operating with each tagging operation on a usage rule tag embedded in the content,
   i. wherein a combined effect of the tagging operations corresponding to the one or more usage rules is to remove all usage rule tags from the content, and
   ii. wherein determining whether all tagging operations corresponding to transformations required by the one or more usage rules have been applied to the content comprises determining whether no usage rule tag is present in the content.

13. A computer program product comprising coded instructions that, when executed on a computing device, implement the method as claimed in claim 11.

14. A content handling device comprising:
a content source module implemented by circuitry and configured to receive content;
a content sink module implemented by circuitry and configured to output the content;
a plurality of content transformation modules implemented by circuitry and defining one or more paths from the content source module to the content sink module, wherein the content is associated with one or more usage rules requiring one or more transformations to be applied to the content and each content transformation module is configured to:
  receive the content,
  apply a transformation to the content in accordance with the usage rules, and
  apply a tagging operation corresponding to the transformation to the content; and
a usage rule tag checking module implemented by circuitry and configured to:
  receive the content,
  determine whether all tagging operations corresponding to transformations required by the one or more usage rules have been applied to the content,
  responsive to the determination being positive, enable the content to be output by the content sink module, and
  responsive to the determination being negative, degrade or block output of the content.

* * * * *